No. 853,655. PATENTED MAY 14, 1907.
C. W. STONE.
PROTECTIVE MEANS FOR PARALLEL FEEDERS.
APPLICATION FILED OCT. 12, 1904.
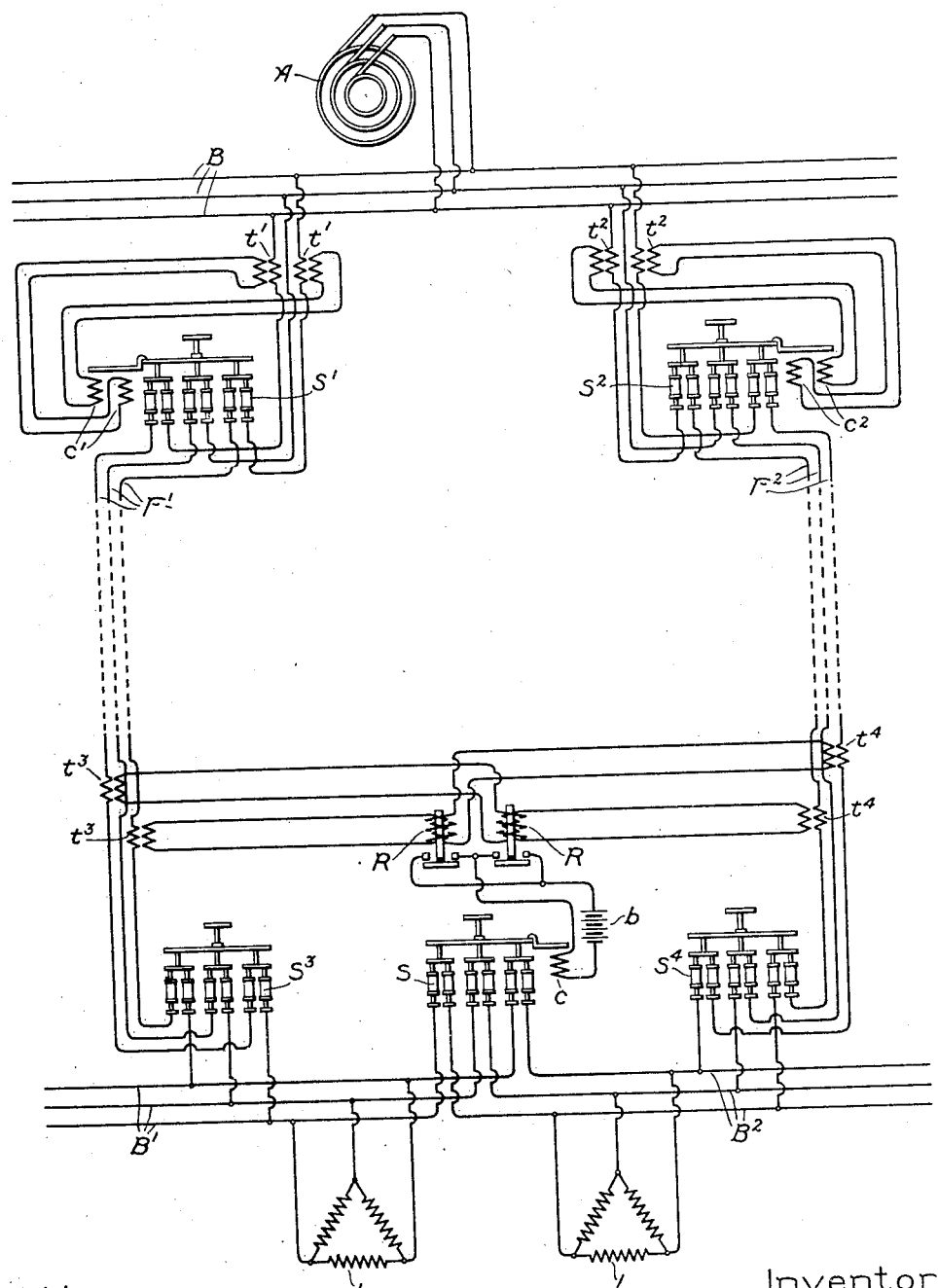
Witnesses.
Inventor.
Charles W. Stone.
by
Atty

UNITED STATES PATENT OFFICE.

CHARLES W. STONE, OF SCHENECTADY, NEW YORK, ASSIGNOR TO GENERAL ELECTRIC COMPANY, A CORPORATION OF NEW YORK.

PROTECTIVE MEANS FOR PARALLEL FEEDERS.

No. 853,655.  Specification of Letters Patent.  Patented May 14, 1907.

Application filed October 12, 1904. Serial No. 228,162.

*To all whom it may concern:*

Be it known that I, CHARLES W. STONE, a citizen of the United States, residing at Schenectady, county of Schenectady, State of New York, have invented certain new and useful Improvements in Protective Means for Parallel Feeders, of which the following is a specification.

My invention relates to the protection of transmission systems employing feeders or transmission lines connected in parallel at both ends, and its object is to provide efficient and reliable means for automatically cutting out one of the feeders or transmission lines at both ends in case it becomes short-circuited.

In transmission systems employing feeders connected in parallel at both ends, it is not sufficient to cut out a feeder at the generating end when a short-circuit occurs thereon, since current will be supplied from the other feeders back from the receiving end to the fault. In order to cut out the faulty feeder at the receiving end, it has been proposed heretofore to employ relays comprising current and potential coils arranged to operate a switch to open the circuit of the feeder upon a reversal of energy flow therein. Such devices are unreliable, however, on a heavy short-circuit, since the potential of the system may be reduced by such an amount that the potential coil of the protective device is practically inoperative; so that the device is liable to fail at the time when its operation is most required.

By my invention the use of potential coils is entirely eliminated, current coils alone being utilized in the protective device.

My invention consists in placing a switch between the feeders or sets of feeders at the receiving end with means for tripping the switch upon a relative reversal of current flow in the feeders. Thus, if such a switch is inserted in the receiving bus-bars between the connections of the two sets of feeders to the bus-bars, a short-circuit on one feeder will automatically open the bus-bar circuit between the feeders, preventing a flow of current from the healthy feeder to the faulty feeder. The faulty feeder may then be disconnected from the bus-bars, and the automatic switch can be again closed so as to supply all the bus-bars and the load connected thereto from the feeder or feeders that are in operative condition.

My invention will best be understood by reference to the accompanying drawing, which shows diagrammatically a transmission system provided with protective means arranged in accordance with my invention.

In the drawing A represents a source of alternating current at the generating station connected to the station bus-bars B. To these bus-bars are connected two or more feeders $F^1$ and $F^2$ through the switches $S^1$ and $S^2$. These switches are provided with the usual overload tripping devices, as indicated by the pairs of coils $c^1$ and $c^2$, each pair energized from a pair of series transformers $t^1$ and $t^2$. The two feeders at the receiving station are connected to the bus-bars through the switches $S^3$ and $S^4$, which are not provided with overload tripping devices. The bus-bars at the receiving station are divided into two sections, as indicated by $B^1$ and $B^2$. These sections are connected by the switch S, which is provided with a trip coil $c$ and a battery $b$ for energizing the circuit of the tripping coil. The circuit of the trip coil $c$ is controlled by two relays R R, which are normally open, and either of which, when closed, closes the circuit of the trip coil, so as to open switch S. Each relay is provided with two coils which are connected to transformers $t^3$ and $t^4$ in similar phases of the two feeders. These coils are so connected that when the flow of current in the two feeders is in the same relative direction, the magnetic effects of the two coils will oppose each other and exert no pull upon the relay. When a short-circuit occurs, however, on one of the feeders, the current in one of the coils of one or both of the relays R will be reversed, relative to the other coil, and consequently the combined effect of the two coils will draw up the relay, closing the circuit of the tripping coil $c$ through battery $b$, and opening switch S. This disconnects the faulty feeder from the bus-bars at the receiving end, the circuit of the faulty feeder being opened at the generating end by the overload device. The faulty feeder may then be disconnected from the section of the receiving bus-bars, to which it is normally connected, and the switch S may then be closed. Thus, for instance, if the feeder $F^2$ is short-circuited, the switch $S^4$ may be opened after the switch S has been tripped, and the switch S may then be closed, connecting both sections $B^1$ and $B^2$ of the receiving bus-bars to the healthy feeder $F'$, which will then supply the entire load, as indicated by L L. The coils of the relays R R should be so proportioned that the normal load on one feeder would not open the relay when the other feeder is open-circuited, or else the relay should be short-circuited or the circuit of the trip coil $c$ opened.

I do not desire to limit myself to the particular construction and arrangement of parts here shown, but aim in the appended claims to cover all modifications which are within the scope of my invention.

What I claim as new and desire to secure by Letters Patent of the United States, is:

1. In combination with parallel feeders, bus-bars at the receiving station to which said feeders are connected, means for disconnecting each set of feeders from said bus-bars, and automatic means for opening the circuit of said bus-bars between the points of connection to said feeders upon a relative reversal of current in said feeders.

2. In combination with parallel feeders, bus-bars at the receiving station, switches for connecting each set of feeders to said bus-bars, a switch for opening the circuit of said bus-bars between the first switches, and a tripping device for the last switch operative upon a relative reversal of current in said feeders.

3. In combination with parallel feeders, bus-bars at the receiving station, switches for connecting each set of feeders to said bus-bars, a switch for opening the circuit of said bus-bars between the first switches, a device having two normally-opposed magnet windings energized respectively from said feeders, and means controlled by said device for opening said switch.

4. In combination with parallel feeders, bus-bars at the receiving station, switches for connecting each set of feeders to said bus-bars, a switch for opening the circuit of said bus-bars between the first switches, a trip coil for the last switch, and a differential relay energized from said feeders and controlling the circuit of said trip coil.

5. In combination with parallel feeders, bus-bars at the receiving station to which said feeders are connected, automatic means for opening the circuit of said bus-bars between the feeders upon a relative reversal of current in the feeders, and manually controlled means for disconnecting said feeders independently of said automatic means.

6. In combination with parallel feeders a switch at the receiving end adapted to disconnect said feeders, series transformers having their primaries in circuit with said feeders, a device having two normally-opposed magnet windings energized from the secondaries of said transformers, means controlled by said device for opening said switch, and manually-controlled switches adapted to disconnect said feeders independently of the first switch.

7. In combination with parallel feeders, bus-bars at the receiving station, switches for connecting each set of feeders to said bus-bars, a switch for opening the circuit of said bus-bars between the first switches, a trip coil for the last switch, series transformers having their primaries in circuit with said feeders, and a differential relay energized from the secondaries of said transformers and controlling the circuit of said trip coil.

In witness whereof I have hereunto set my hand this tenth day of October, 1904.

CHARLES W. STONE.

Witnesses:
EDWARD WILLIAMS, Jr.,
HELEN ORFORD.